(12) United States Patent
Lin et al.

(10) Patent No.: US 7,239,475 B1
(45) Date of Patent: Jul. 3, 2007

(54) DISK DRIVE WITH AIRFLOW DIVERTER FILTER COMPONENT

(75) Inventors: Jen-Tai Lin, Fremont, CA (US); Jin Hui Ou-Yang, San Jose, CA (US); Chiao-Ping Ku, Fremont, CA (US); Shuo-Hao Chen, Cupertino, CA (US); Lin Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 444 days.

(21) Appl. No.: 10/856,322

(22) Filed: May 28, 2004

(51) Int. Cl.
*G11B 33/34* (2006.01)

(52) U.S. Cl. .............................. 360/97.02; 360/97.03; 360/97.04; 360/75; 720/648

(58) Field of Classification Search ................. 360/75, 360/97.01–97.04; 55/385.1–385.6, 482; 760/648
See application file for complete search history.

(56) References Cited

U.S. PATENT DOCUMENTS

| | | | | |
|---|---|---|---|---|
| 4,886,527 A | * | 12/1989 | Fottinger et al. ............... | 95/78 |
| 6,238,467 B1 | * | 5/2001 | Azarian et al. ................. | 96/135 |
| 6,266,208 B1 | * | 7/2001 | Voights ..................... | 360/97.02 |
| 6,473,264 B2 | * | 10/2002 | Bae et al. .................. | 360/97.02 |
| 6,618,222 B1 | * | 9/2003 | Watkins et al. ............. | 360/97.02 |
| 6,628,475 B2 | * | 9/2003 | Nakamoto et al. ......... | 360/97.02 |
| 6,876,514 B1 | * | 4/2005 | Little ....................... | 360/97.02 |
| 2002/0075590 A1 | * | 6/2002 | Garikipati et al. ........ | 360/97.02 |
| 2003/0218829 A1 | * | 11/2003 | Hong et al. .............. | 360/97.02 |
| 2005/0185327 A1 | * | 8/2005 | Voights et al. ........... | 360/97.03 |

FOREIGN PATENT DOCUMENTS

JP 02252185 A * 10/1990

\* cited by examiner

*Primary Examiner*—William Korzuch
*Assistant Examiner*—Jason M. Garr
(74) *Attorney, Agent, or Firm*—Stetina, Brunda, Garred & Brucker

(57) ABSTRACT

A disk drive including a disk drive base, a disk coupled to the disk drive base, and a head stack assembly coupled to the disk drive base. The disk drive further includes an airflow diverter filter component disposed upstream of the head stack assembly with respect to disk rotation induced airflow for modifying the disk rotation induced airflow adjacent the head stack assembly. The filter component includes a first filter element disposed adjacent the disk surface, a second filter element disposed between the first filter element and the head stack assembly, and a third filter element having a porosity finer than the first and second filter elements. The third filter element is generally radially further than the second filter element from the axis of rotation. The disk rotation induced airflow generally enters the filter component through the first filter element and exits through the second and third filter elements.

14 Claims, 4 Drawing Sheets

DISK DRIVE WITH AIRFLOW DIVERTER FILTER COMPONENT

BACKGROUND OF THE INVENTION

1. Field of the Invention

The present invention relates generally to disk drives, and in particular to a disk drive including an airflow diverter filter component.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data from and to the disk.

The spindle motor includes a spindle motor hub that is rotatably coupled to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A topic of concern is the desire to reduce the effects of airflow generated within the disk drive due to rotation of the disks. Of particular concern is the occurrence of turbulent airflow which may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disks or disk flutter.

Another topic of concern is contamination within the disk drive, and in particular, the rate and efficiency of filtering contamination. Various airflow circulation filtering systems have been utilized in the art. A typical arrangement is to provide a vertically disposed rectangular filter within a cavity of the disk drive. The filter is positioned such that disk rotation induced airflow impinges upon the filter. While much of the airflow flows through the filter, some airflow is found to flow upwards towards the cover. Such redirected airflow may tend to flow about the surface of the uppermost disk. In this regard, the heads at such location have been observed to be relatively more susceptible to failures due to contamination.

Accordingly, there is a need in the art for an improved disk drive configuration for filtering and mitigation of disk rotation induced airflow in comparison to the prior art.

SUMMARY OF THE INVENTION

According to an aspect of the present invention, there is provided a disk drive. The disk drive includes a disk drive base. The disk drive further includes a disk rotatably coupled to the disk drive base. The disk includes a disk surface and defines an axis of rotation. The disk drive further includes a head stack assembly rotatably coupled to the disk drive base adjacent the disk surface. The disk drive further includes an airflow diverter filter component disposed adjacent the disk surface upstream of the head stack assembly with respect to disk rotation induced airflow for modifying the disk rotation induced airflow adjacent the head stack assembly. The airflow diverter filter component includes a first filter element disposed adjacent the disk surface, a second filter element disposed between the first filter element and the head stack assembly, and a third filter element having a porosity finer than the first and second filter elements. The third filter element is generally radially further than the second filter element from the axis of rotation. The disk rotation induced airflow generally enters the airflow diverter filter component through the first filter element and exits through the second and third filter elements.

According to various embodiments, the third filter element may be generally faced towards the head stack assembly at an angle between 35 and 45 degrees with respect to a tangent of the disk. The third filter element may be generally planar. The first and second filter elements may be disposed in spaced relationship to each other. The airflow diverter filter component may include a component housing. The first, second and third filter elements are supported by the filter housing. The component housing and the first, second and third filter elements define a cavity. The component housing may be formed of plastic. The component housing may be generally rectangular. The disk drive may further include a cover attached to the disk drive base, and the airflow diverter filter component may be attached to the cover. The disk drive may further include a disk drive base filter coupled to the disk drive base disposed radially beyond the disk, and the disk drive base filter may be angularly disposed between the first filter element and the head stack assembly with respect to the disk.

In addition, the airflow diverter filter component may include a fourth filter element. The third filter element may be generally radially further than the fourth filter element from the axis of rotation. The second filter element may be disposed between the fourth filter element and the head stack assembly, and the disk rotation induced airflow generally enters the airflow diverter filter component through the first filter element and exits through the second, third, and fourth filter elements. The third filter element may have a porosity finer than the fourth filter element. The fourth filter element may be generally faced away from the head stack assembly at an angle between 35 and 45 degrees with respect to a tangent of the disk. The third and fourth filter elements may be disposed in spaced relationship.

DESCRIPTION OF THE PREFERRED EMBODIMENTS

Figure 1:
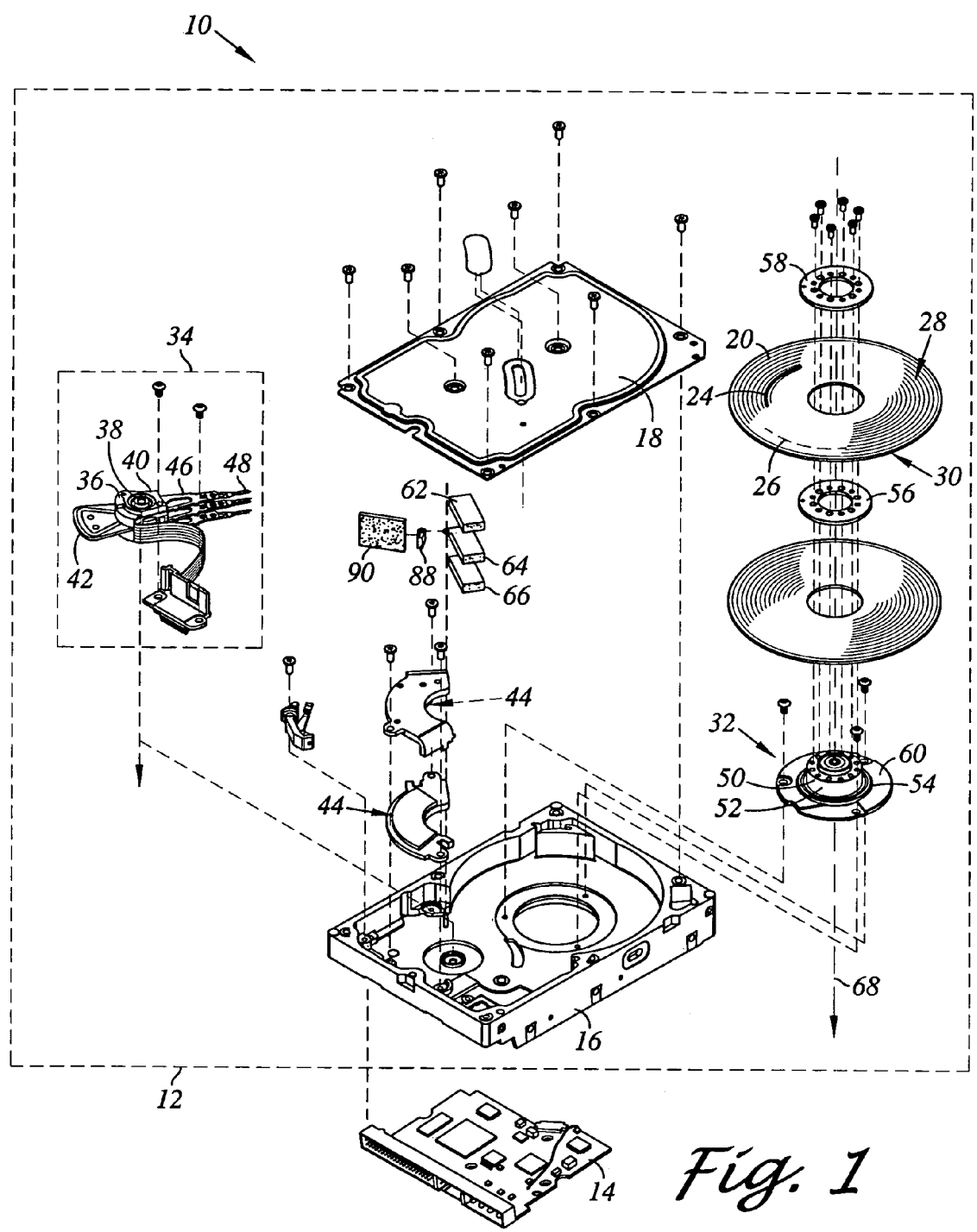
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1-5 illustrate a disk drive including an airflow diverter filter components in accordance with aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data. The magnetic disks 20, 22 may be two-sided, and thus for example, the magnetic disk 20 is shown having a track 24 on an upper facing side 28 and a track 26 (shown in phantom) on a lower facing side 30. The head disk assembly 12 further includes a spindle motor 32 for rotating the magnetic disks 20, 22. The head disk assembly 12 further includes a head stack assembly 34 and a pivot bearing cartridge 36. The head stack assembly 34 includes a rotary actuator 38.

The rotary actuator 38 includes an actuator body 40 that has a bore and the pivot bearing cartridge 36 is engaged within the bore for facilitating the rotary actuator 38 to rotate between limited positions. The rotary actuator 38 further includes a coil portion 42 that extends from one side of the actuator body 40 to interact with a pair of permanent magnets 44 to form a voice coil motor for pivoting the rotary actuator 38. A plurality of actuator arms, the uppermost one of which being denoted 46, extends from an opposite side of the actuator body 40. As the disks 20, 22 may be two-sided, each of the actuator arms includes either one or two head gimbal assemblies associated with the adjacent sides of the disks 20, 22. Each head gimbal assembly includes an air bearing slider or slider (the lowermost one being denoted 48). Each air bearing slider 48 is contemplated to include a transducer head for reading and writing data from and to the disks 20, 22.

The spindle motor 32 includes a spindle motor hub 50 that is rotatably attached to the disk drive base 16. The spindle motor hub 50 has a hub body 52 and a hub flange 54 that extends from the hub body 52. The hub flange 54 includes a supporting surface for supporting a lowermost one of the disks, namely disk 22. The remaining disk 20 is stacked on disk 22 and separated with an annular disk spacer 56 that is disposed about the hub body 52. A disk clamp 58 is attached about the spindle motor hub 50 and is utilized to apply a clamping force against the topmost disk 20 for securing all the disks 20, 22 to the spindle motor hub 50. The spindle motor 32 may further include a spindle motor base 60 that is mounted to the disk drive base 16.

As will be discussed in further detail below, in the embodiment shown, the disk drive 10 includes airflow diverter filter components 62, 64, 66 which are generally configured to modify and filter disk rotation induced airflow within the disk drive 10. It is understood that such airflow diverter filter components 62, 64, 66 represent various aspects of the present invention and that the invention may be practiced with any one of such components 62, 64, 66 or in combination such as shown in this particular embodiment.

Figure 2:
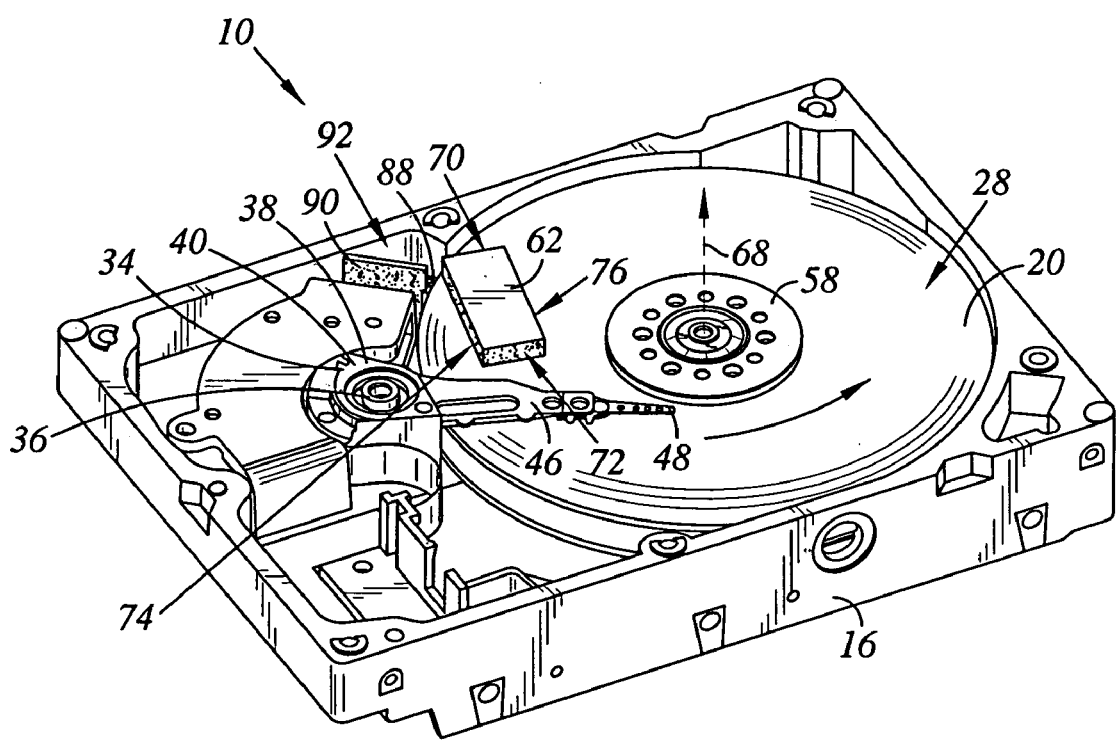
FIG. 2 is an enlarged perspective view of the disk drive (without a cover) of FIG. 1 as shown with an airflow diverter filter component exploded from a remainder of the disk drive.
Figure 3:
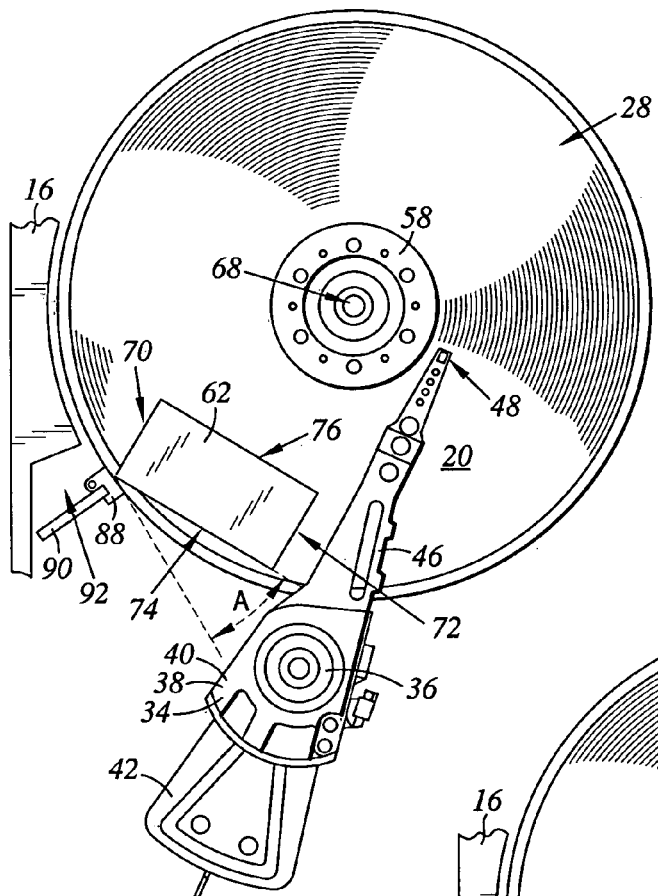
FIG. 3 is an enlarged plan view of selected components of the disk drive including of the airflow diverter filter component, a disk and a head stack assembly of FIG. 2.
Figure 4:
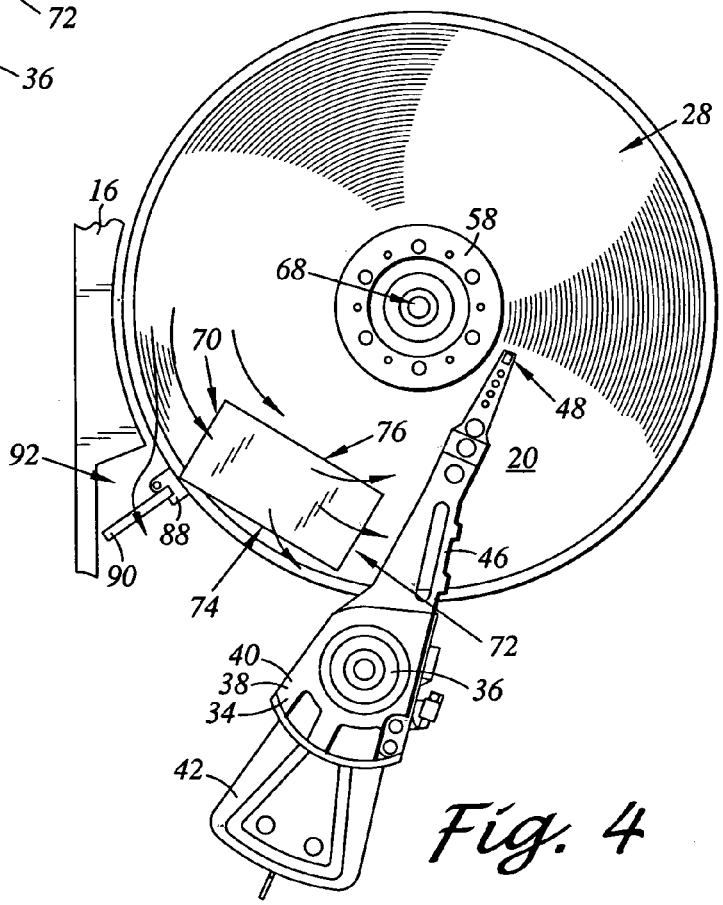
FIG. 4 is the enlarged plan view of FIG. 3 as shown with symbolic airflow lines.
Figure 5:
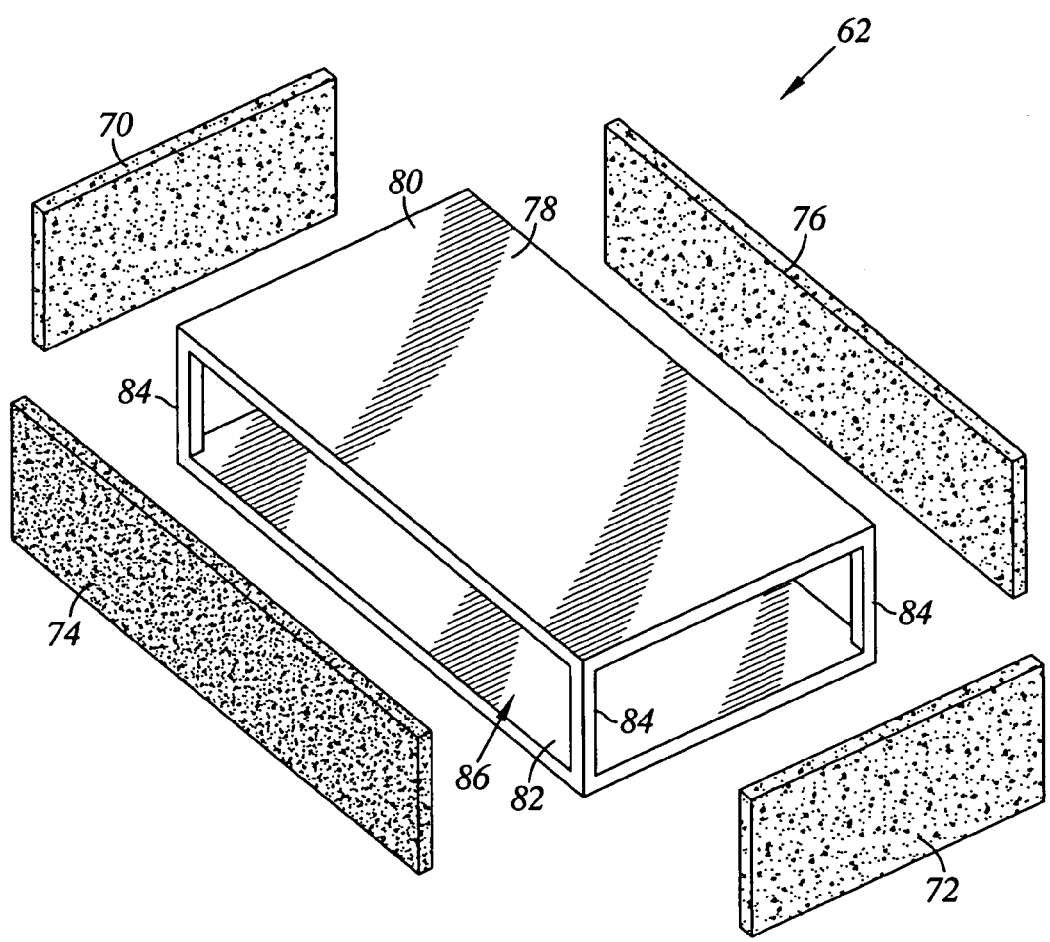
FIG. 5 is an exploded perspective view of the airflow diverter filter component.

Referring additionally to FIG. 2 there is depicted an enlarged perspective view of the disk drive 10 (without the cover 18) of FIG. 1 as shown with the airflow diverter filter components 62, 64, 66 exploded from a remainder of the disk drive 10. FIG. 3 is an enlarged plan view of the airflow diverter filter component 62, the disk 20 and the head stack assembly 34 of the disk drive 10 of FIG. 1 as assembled. FIG. 4 is a view of FIG. 3 as shown with symbolic airflow lines. An enlarged exploded perspective view of the airflow diverter filter component 62 is depicted in FIG. 5.

According to an aspect of the present invention, there is provided the disk drive 10. The disk drive 10 includes the disk drive base 16. The disk drive 10 further includes a disk, such as disk 20, rotatably coupled to the disk drive base 16. The disk 20 includes a disk surface, such as the upper facing surface 28, and defines an axis of rotation 68. The disk drive 10 further includes the head stack assembly 34 rotatably coupled to the disk drive base 16 adjacent the upper facing surface 28. The disk drive 10 further includes an airflow diverter filter component such as the airflow diverter filter component 62, disposed adjacent the upper facing surface 28 upstream of the head stack assembly 34 with respect to disk rotation induced airflow for modifying the disk rotation induced airflow adjacent the head stack assembly 34. The airflow diverter filter component 62 includes a first filter element 70 disposed adjacent the upper facing surface 28, a second filter element 72 disposed between the first filter element 70 and the head stack assembly 34, and a third filter element 74 having a porosity finer than the first and second filter elements 70, 72. The third filter element 74 is generally radially further than the second filter element 72 from the axis of rotation 68. The disk rotation induced airflow generally enters the airflow diverter filter component 62 through the first filter element 70 and exits through the second and third filter elements 72, 74.

According to various embodiments, the airflow diverter filter components 62, 64, 66 may further include a fourth filter element 76. The second filter element 72 is disposed between the fourth filter element 76 and the head stack assembly 34. The third filter element 74 may have a porosity finer than the fourth filter element 76.

The third filter element 74 may have a porosity finer than the first, second and fourth filter elements 76. In this regard, such differing porosity refers to an average in such given section and that the difference of such element is greater than a mere difference due to manufacturing tolerances. The materials utilized to construct the first, second, third and fourth filter elements 70, 72, 74, 76 are contemplated to be chosen from those which are well known to one of ordinary skill in the art. The first, second, third and fourth filter elements 70, 72, 74, 76 may be formed of an electrostatic material to further increase the filtering ability. Although the first, second, third and fourth filter elements 70, 72, 74, 76 are shown as relatively thin pieces of material, the first, second, third and fourth filter elements 70, 72, 74, 76 may have differing thicknesses and may take up a larger percentage of volume of the airflow diverter filter components 62, 64, 66 than is shown in the figures. It is contemplated that the porosity of the third filter element 74 may be considered to be made finer than the first, second and fourth filter elements, 70, 72, 76 by having a greater thickness. The first, second, third and fourth filter elements 70, 72, 74, 76 may be each formed of a single layer of material or multiple layers. It is contemplated that the first, second and fourth filter elements 70, 72, 76 may have differing porosities or may be the same. In addition, the first, second, and fourth filter elements 70, 72, 76 may be separately formed or integrally formed.

The first and second filter elements 70, 72 may be disposed in spaced relationship to each other. Further, the first and second filter elements 70, 72 may be disposed parallel to each other. Similarly, the third and fourth filter elements 74, 76 may be also disposed in spaced relationship and parallel to each other.

As mentioned above, the third filter element 74 is generally radially further than the second filter element 72 from the axis of rotation 68. Further, the third filter element 74 may be disposed generally radially further than the first and fourth filter elements 70, 76 from the axis of rotation 68 as well. In this regard, being generally radially further refers to an average across the entire element. Thus, while some portion of the first filter element 70 (such as that portion of the first filter element 70 immediately adjacent the third filter element 74) may be radially further from the axis of rotation 68 than some portion of the third filter element 74 (such as that portion of the third filter element 74 immediately adjacent the second filter element 72), on average the third filter element 74 is generally radially further than the first filter element 70 from the axis of rotation 68.

The third filter element 74 may be generally faced towards the head stack assembly 34 at an angle (A) between 35 and 45 degrees with respect to a tangent of the disk 20. As the angle A increases, the third filter element 74 faces more towards the head stack assembly 34. As the fourth filter element 76 may be disposed parallel to the third filter element 74, the fourth filter element 76 may be generally faced away from the head stack assembly 34 at an angle between 35 and 45 degrees with respect to a tangent of the disk 20.

The airflow diverter filter elements 62, 64, 66 may take a variety of geometric shapes. Though not required, in the embodiments shown, the airflow diverter filter elements 62, 64, 66 define a rectangular shape with each of the first, second, third and fourth filter elements 70, 72, 74, 76 being generally planar. As the invention may be practiced without the fourth filter element 76, though not shown, it is contemplated that the airflow diverter elements 62, 64, 66 may take a triangular form with the first, second and third filter elements 70, 72, 74 forming three legs of a triangle.

As illustrated by FIG. 5, the airflow diverter filter components 62, 64, 66 may each include a component housing 78. The first, second, third and fourth filter elements 70, 72, 74, 76 may be supported by the component housing 78. In this regard, the first, second, third and fourth filter elements 70, 72, 74, 76 may be directly attached to the component housing 78, such as with an adhesive. Alternatively, the first, second, third and fourth filter elements 70, 72, 74, 76 may be simply held in place by the surrounding component housing 78.

The component housing 78 may include top and bottom plates 80, 82 and corner supports 84. The top and bottom plates 80, 82 and the corner supports 84 may be integrally formed or separate elements. The component housing 78 and the first, second, third and fourth filter elements 70, 72, 74, 76 define a cavity 86. It is contemplated that the component housing 78 may be constructed in accordance with any of those methods which are well known to one of ordinary skill in the art. In this regard, the component housing 78 is just an exemplary embodiment and not all of the top and bottom plates 80, 82 and the corner supports 84 may be required. For example, the corner supports 84 may not have to be utilized in a configuration where the first, second, third and fourth filter elements 70, 72, 74, 76 are attached to each other at their edges. Further, the component housing 78 may be a variety of shapes and formed of a variety of materials. In the embodiment shown the component housing 78 is generally rectangular in shape and formed of a molded plastic material for example.

In the embodiment shown, the airflow diverter filter components 62, 64, 66 are supported in a variety of ways. The airflow diverter filter component 62 is attached to the cover 18. The top plate 80 of the component housing 78 of the airflow diverter filter component 62 may be adhesively bonded to an underside of the cover 18. The airflow diverter filter component 64 which is disposed between the disks 20, 22 is supported by a support arm 88. The support arm 88 is attached to the disk drive base 16. In this regard, the top plate 80 of the component housing 78 of the airflow diverter filter component 64 is attached to the support arm 88. The airflow diverter filter component 66 is directly attached to the disk drive base 16.

The disk drive 10 may further include a disk drive base filter 90 coupled to the disk drive base 16. The disk drive base filter 90 is disposed radially beyond the disks 20, 22. As best seen in FIGS. 3 and 4, the disk drive base filter 90 may be angularly disposed between the first filter element 70 and the head stack assembly 34 with respect to the disk 20. Thus, the disk drive base filter 90 is disposed downstream of the first filter element 70 in relation to the rotation of the disks 20, 22. The disk drive base filter 90 may be supported by the support arm 88. A flow channel 92 may be formed in the disk drive base 16.

The airflow diverter filter components 60, 62, 64 are positioned upstream of the head stack assembly 34 in relation to the rotation of the disk 20. During operation of the disk drive 10, disk rotation induced airflow is contemplated to flow into the first filter element 70. Airflow passes into the cavity 86 of the component housing 78. Contaminants may tend to become "trapped" and collected by the component housing 78 itself, in addition to a tendency of the first, second, third and fourth filter elements 70, 72, 74, 76 themselves to retain filtered contaminants.

As seen in FIG. 4, there is depicted an enlarged plan view of the airflow diverter filter component 62 as shown with symbolic airflow lines. The airflow diverter filter component 62 is configured such that disk rotation induced airflow generally enters the airflow diverter filter component 62 through the first filter element 70 and exits through the second, third, and fourth filter elements 72, 74, 76. The airflow diverter filter components 62, 64, 66 tend to slow the exiting disk rotation induced airflow, and therefore reduces the impact of the airflow upon the actuator arms 46 (i.e., windage). In addition, the presence of the airflow diverter filter components 62, 64, 66 tends to channel that airflow which does not enter the airflow diverter filter components 62, 64, 66. In this regard, airflow may be redirected towards the center of the disks 20, 22 and radially exterior of the disks 20, 22 into the airflow channel 92 for filtering by the disk drive base filter 90.

It is contemplated that the angularly disposed nature of the airflow diverter filter components 62, 64, 66 allows for relatively smoother flow in comparison to a more perpendicular or radially aligned configuration. As such, it is contemplated that such angularly disposed configuration allows for more of a diverting function rather than simply a blocking function. To the extent that a more perpendicular or radially aligned configuration were to be utilized, a relatively more turbulent airflow pattern would be developed immediately downstream of the airflow diverter filter components 62, 64, 66. In this regard, during operation of the disk drive 10, of particular concern is the occurrence of turbulent airflow that may tend to excite a resonance response of the head stack assembly 34.

It is contemplated that disk rotation induced airflow that may result in vibration of the disks 20, 22 or disk flutter. As such, utilization of the airflow diverter filter components 62, 64, 66 may generally reduce disk rotation induced airflow and therefore may mitigate disk flutter.

We claim:

1. A disk drive comprising:
   a disk drive base;
   a disk rotatably coupled to the disk drive base, the disk including a disk surface and defining an axis of rotation;
   a head stack assembly rotatably coupled to the disk drive base adjacent the disk surface; and
   an airflow diverter filter component disposed adjacent the disk surface upstream of the head stack assembly with respect to disk rotation induced airflow for modifying the disk rotation induced airflow adjacent the head stack assembly, the airflow diverter filter component including:
   a first filter element disposed adjacent the disk surface;
   a second filter element disposed between the first filter element and the head stack assembly; and
   a third filter element having a porosity finer than the first and second filter elements, the third filter element being generally radially further than the second filter element from the axis of rotation;
   wherein the disk rotation induced airflow generally enters the airflow diverter filter component through the first filter element and exits through the second and third filter elements.

2. The disk drive of claim 1 wherein the third filter element is generally faced towards the head stack assembly at an angle between 35 and 45 degrees with respect to a tangent of the disk.

3. The disk drive of claim 1 wherein the third filter element is generally planar.

4. The disk drive of claim 1 wherein the first and second filter elements are disposed in spaced relationship to each other.

5. The disk drive of claim 1 wherein the airflow diverter filter component includes a component housing, the first, second and third filter elements are supported by the component housing.

6. The disk drive of claim 5 wherein the component housing and the first, second and third filter elements define a cavity.

7. The disk drive of claim 5 wherein the component housing is formed of plastic.

8. The disk drive of claim 5 wherein the component housing is generally rectangular.

9. The disk drive of claim 1 wherein the airflow diverter filter component includes a fourth filter element, the third filter element is generally radially further than the fourth filter element from the axis of rotation, the second filter element is disposed between the fourth filter element and the head stack assembly, the disk rotation induced airflow generally enters the airflow diverter filter component through the first filter element and exits through the second, third, and fourth filter elements.

10. The disk drive of claim 9 wherein the third filter element has a porosity finer than the fourth filter element.

11. The disk drive of claim 9 wherein the fourth filter element is generally faced away from the head stack assembly at an angle between 35 and 45 degrees with respect to a tangent of the disk.

12. The disk drive of claim 9 wherein the third and fourth filter elements are disposed in spaced relationship.

13. The disk drive of claim 1 further includes a cover attached to the disk drive base, the airflow diverter filter component is attached to the cover.

14. The disk drive of claim 1 further includes a disk drive base filter coupled to the disk drive base disposed radially beyond the disk, the disk drive base filter is angularly disposed between the first filter element and the head stack assembly with respect to the disk.

* * * * *